US008226760B2

(12) United States Patent
Collier et al.

(10) Patent No.: US 8,226,760 B2
(45) Date of Patent: Jul. 24, 2012

(54) ALPHA-ALUMINA INORGANIC MEMBRANE SUPPORT AND METHOD OF MAKING THE SAME

(75) Inventors: Adam Kent Collier, Painted Post, NY (US); Wei Liu, Richland, WA (US); Jianguo Wang, Horseheads, NY (US); Jimmie Lewis Williams, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/915,229

(22) Filed: Oct. 29, 2010

(65) Prior Publication Data

US 2011/0045971 A1 Feb. 24, 2011

Related U.S. Application Data

(62) Division of application No. 12/001,263, filed on Dec. 11, 2007, now abandoned.

(51) Int. Cl.
*A61L 15/32* (2006.01)
(52) U.S. Cl. ........ 106/122; 423/628; 502/439; 264/610; 55/523; 428/116; 428/523
(58) Field of Classification Search ................... 423/628
See application file for complete search history.

(56) References Cited

U.S. PATENT DOCUMENTS

| | | | |
|---|---|---|---|
| 3,312,558 A * | 4/1967 | Miller, Jr. ..................... 423/600 |
| 3,726,811 A * | 4/1973 | Toombs et al. ............... 423/628 |
| 5,223,318 A | 6/1993 | Faber et al. ........................ 3/12 |
| 5,266,548 A | 11/1993 | Koradia et al. ............... 502/439 |
| 5,527,624 A | 6/1996 | Higgins et al. ................ 428/523 |
| 5,641,332 A | 6/1997 | Faber et al. ....................... 39/20 |
| 6,548,142 B1 | 4/2003 | Kar et al. ............................ 3/12 |
| 7,141,089 B2 * | 11/2006 | Beall et al. ...................... 264/44 |
| 2004/0029707 A1 * | 2/2004 | Beall et al. .................... 264/631 |
| 2004/0148916 A1 * | 8/2004 | Merkel ............................. 264/44 |
| 2006/0090649 A1 | 5/2006 | Liu et al. ............................ 53/22 |
| 2006/0183632 A1 | 8/2006 | Shustack et al. .............. 502/159 |
| 2007/0006561 A1 * | 1/2007 | Brady et al. .................... 55/523 |
| 2007/0119135 A1 * | 5/2007 | Miao et al. ...................... 55/523 |
| 2007/0142208 A1 | 6/2007 | Addiego et al. ............... 501/109 |
| 2008/0047243 A1 * | 2/2008 | Beall et al. ....................... 55/523 |

FOREIGN PATENT DOCUMENTS

| | | | |
|---|---|---|---|
| EP | 0 548 492 | 6/1993 | |
| EP | 0 787 524 | 8/1997 | ........................ 63/6 |
| JP | 02-102723 | 4/1990 | ........................ 71/2 |
| WO | 2006/037387 | 4/2006 | |

OTHER PUBLICATIONS

K. Keizer et al., "Progress in inorganic membranes". CHEMTECH (1996), 26(1), pp. 37-41.
Gregorova et al.; "Characerization of different starch types for their application in ceramic processing"; Journal of the European Ceramic Society 26 (2006) 1301-1309.
Han et al.; "Fabrication of bimodal porous alumina ceramics"; Materials Research Bulletin 38 (2003) 373-379.
Gregorova et al.; "Porosity and pore size control in starch consolidation casting of oxide ceramics—Achievements and problems"; Journal of the European Ceramic Society 27 (2007) 669-672.

* cited by examiner

*Primary Examiner* — Jerry Lorengo
*Assistant Examiner* — Ross J Christie
(74) *Attorney, Agent, or Firm* — Tina N. Thompson

(57) ABSTRACT

Compositions for making alpha-alumina supports for, for example, inorganic membranes are described. Methods for controlling the alumina and pore former particle sizes and other process variables are described which facilitate desirable porosity, pore distribution and strength characteristics of the resulting alpha-alumina inorganic membrane supports.

11 Claims, 5 Drawing Sheets

ALPHA-ALUMINA INORGANIC MEMBRANE SUPPORT AND METHOD OF MAKING THE SAME

This application is a Divisional application and claims the benefit of priority to U.S. patent application Ser. No. 12/001,263, filed on Dec. 11, 2007 now abandoned.

BACKGROUND

1. Field of the Invention

The invention relates generally to alpha-alumina inorganic membrane supports and more particularly to controlling porosity, pore distribution and strength characteristics of alpha-alumina inorganic membrane supports via control of alumina and/or pore former particle sizes and other process variables.

2. Technical Background

In the field of membrane separations, thin porous materials deposited on porous supports are widely used for micro-filtration or ultra-filtration of liquid media and for gas separation. The porous support functions to provide mechanical strength for the thin porous materials.

Porous ceramic supports can be deposited with inorganic coatings to form a membrane structure for use in, for example, filtration and separation applications in, for example, the environmental, biological, food and drink, semi-conductor, chemical, petrochemical, gas and energy industries. These industries often require purified gas/vapor or purified liquid whose source is a mixed feed stream composed of different gas and/or liquid/particulate combinations. Specific examples include purification and separation of hydrogen gas, sequestration of carbon dioxide gas, filtration of oil/water mixtures, wastewater treatment, filtration of wines and juices, filtration of bacteria and viruses from fluid streams, separation of ethanol from biomass, production of high purity gas and water for the semiconductor and microelectronics industry.

The membrane support functions to provide a high geometric surface area packing density for film/coating deposition and, at the same time, it is advantageous if the support has high permeability, strength, chemical stability, thermal stability and structural uniformity.

A monolithic inorganic membrane product concept and macroscopic design parameters are described in detail in commonly owned US Patent Application Publication 2006/0090649. This design has the advantage of high surface area packing density and geometric simplicity for easy engineering as compared to conventional designs. In this design configuration, it is advantageous that the support have high permeability and high strength.

Commonly owned EP Patent No. 0,787,524 relates to a mullite membrane support design. The mullite membrane support is configured as a honeycomb of 0.2 μm average pore size and is used to fabricate a membrane module.

Commonly owned U.S. Pat. No. 5,223,318 relates to the making of titania substrates for membrane supports.

High purity α-alumina is known to have high chemical stability in acid, base and other reactive environments and also has high thermal and hydrothermal stability. High purity α-alumina is used in research on various inorganic membranes, and is a preferred material from which to make membrane supports. Alumina membranes, generally in a single tube form, have been developed and used for isotopic separation of uranium for nuclear reactor applications. Abe, Fumio; Mori, Hiroshi. "Inorganic porous membranes" (NGK Insulators, Ltd., Japan) Jpn. Kokai Tokkyo Koho (1990), relates to a method of using a glass binder to make an α-alumina support of a multi-channel structure. Pall Corporation provides alumina supports in single tube and multi-channel form under the product name Membralox®. However, these existing multi-channel products have large channel sizes (>2 mm) and thus provide low surface area packing density as well as low porosity (<36%).

There is a need for an α-alumina support in a monolith structured form having high purity, large pore size, high porosity and uniform pore distribution facilitating a membrane support capable of being used for a variety of membrane filtration applications. The high purity of the α-alumina support would be useful in maintaining chemical stability, since impurities generally make the alumina more reactive. The large pore size and the high porosity would be useful in, for example, providing high permeability and high thermal stability. At the same time, the pore structure and distribution should be well balanced in order to maintain mechanical strength and structural uniformity.

SUMMARY OF THE INVENTION

The invention discloses compositions and methods useful for making high purity α-alumina monolith supports having large pore sizes and high porosity which can be used as, for example, inorganic membrane supports as well as for other applications.

One embodiment of the invention is a composition comprising from 50 weight % to 90 weight % of α-alumina particles, from 10 weight % to 30 weight % of organic pore former particles, and from 1 weight % to 15 weight % of a sintering aid.

Another embodiment of the invention is a method of forming an α-alumina support. The method comprises providing a batch composition comprising 50 weight % to 90 weight % α-alumina particles, 10 weight % to 30 weight % of organic pore former particles and 1 weight % to 15 weight % of a sintering aid, shaping the batch to form a green body, and sintering the green body to form the α-alumina support.

Another embodiment of the invention is an α-alumina support comprising a mean pore size of from 6 microns to 15 microns and having a pore size distribution of from 0.50 to 1.70 as described by the formula:

$$d_{ps} = (dp_{90} - dp_{10})/dp_{50};$$

wherein $dp_{10}$ is a pore size wherein 10% of the pore volume has a smaller pore size;

$dp_{50}$ is a median pore size wherein 50% of the pore volume has a smaller pore size; and $dp_{90}$ is a pore size wherein 90% of the pore volume has a smaller pore size.

The α-alumina supports, according to the invention, have one or more desirable properties, such as high geometric surface area packing density for membrane deposition, high porosity, high permeability, high strength, chemical stability, thermal stability, structural uniformity, narrow pore size distribution, etc. into a single support structure.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

The invention can be understood from the following detailed description either alone or together with the accompanying drawing figures.

DETAILED DESCRIPTION

Figure 1:
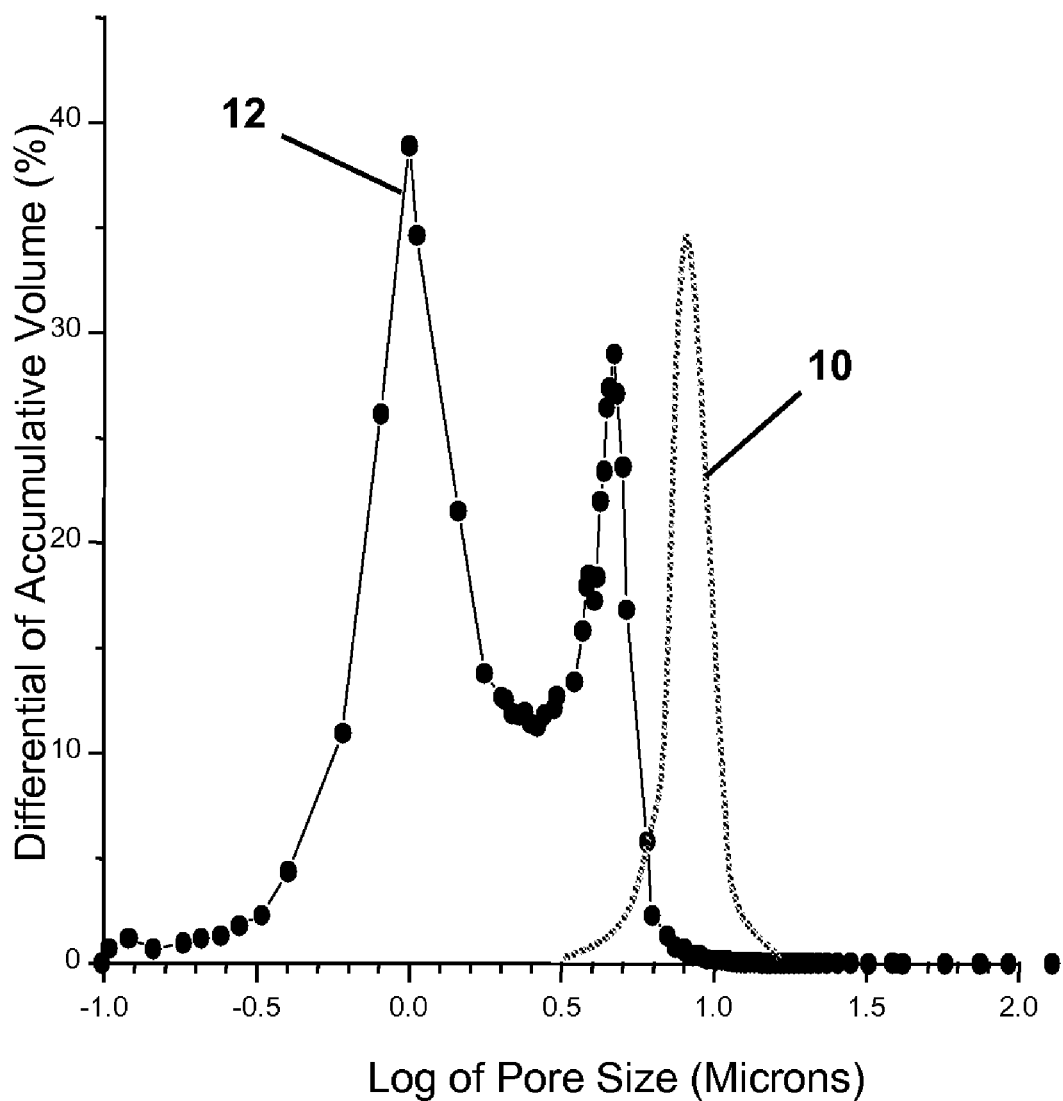
FIG. 1 is a graph showing permeability of exemplary α-alumina supports as a function of mean pore size and narrow pore distribution.

Reference will now be made in detail to various embodiments of the invention, examples of which are illustrated in the accompanying drawings. Wherever possible, the same reference numbers will be used throughout the drawings to refer to the same or like parts.

One embodiment of the invention is a composition comprising from 50 weight % to 90 weight % of α-alumina particles, from 10 weight % to 30 weight % of organic pore former particles, and from 1 weight % to 15 weight % of a sintering aid. In one embodiment, the composition further comprises fluid components, for example, water, one or more oils and combinations thereof. Other components, according to one embodiment, can be binder materials, for example methylcellulose or the like. These materials can be used alone or in combination to provide a remaining weight % for a total weight % of 100 weight %.

Another embodiment is a method for forming an α-alumina support that comprises providing a batch composition comprising 50 weight % to 90 weight % α-alumina particles, 10 weight % to 30 weight % of organic pore former particles and 1 weight % to 15 weight % of a sintering aid, shaping the batch to form a green body, and sintering the green body to form the α-alumina support.

According to the invention, the α-alumina monolith support comprises one or more of the following properties;
 a) Pore size in the range of from 6 µm to 15 µm;
 b) Pore size distribution ($d_{ps}$), as measured by $d_f=(dp_{50}-dp_{10})/dp_{50}$, of 0.30 or less;
 c) Strength, as measured by modulus of rupture (MOR), of 2000 psi or greater, for example, greater than around 5000 psi;
 d) Water permeability of 50000 L/h/m²/bar or greater; and/or
 e) $N_2$ permeability of 10000 sccm/cm²/bar or greater.

Particle size distribution (PSD) in alpha-alumina inorganic supports, according to the invention, may be described by the following formula:

$$PSD=(PD_{90}-PD_{10})/PD_{50};$$

wherein $PD_{10}$ is a particle size wherein 10% of the particle volume has a smaller particle size;
$PD_{50}$ is a median particle size wherein 50% of the particle volume has a smaller particle size; and
$PD_{90}$ is a particle size wherein 90% of the particle volume has a smaller particle size. Particle size can be measured by a laser diffraction technique, using, for example, a Microtrac particle size analyzer.

In another embodiment, the α-alumina support comprises a mean pore size of from 6 microns to 15 microns and has a pore size distribution of from 0.50 to 1.70 as described by the formula:

$$d_{ps}=(dp_{90}-dp_{10})/dp_{50};$$

wherein $dp_{10}$ is a pore size wherein 10% of the pore volume has a smaller pore size;
$dp_{50}$ is a median pore size wherein 50% of the pore volume has a smaller pore size; and
$dp_{90}$ is a pore size wherein 90% of the pore volume has a smaller pore size.

It is advantageous if the smaller pore size portion of the pore size distribution (that portion of the distribution equal to and below $dp_{50}$) is controlled to be relatively narrow. This so-called "d-factor" ($d_f$), is utilized herein to measure and characterize the narrowness of the smaller pore size portion of the pore size distribution. The d-factor is described by the following formula:

$$d_f=(dp_{50}-dp_{10})/dp_{50};$$

wherein $dp_{10}$ and $dp_{50}$ are as defined above.
In one embodiment, the α-alumina support has a d-factor of from 0.20 to 0.60.

The α-alumina support, according to one embodiment, comprise a first end, a second end, and an inner channel having surfaces defined by porous walls and extending through the support from the first end to the second end. According to another embodiment, the α-alumina support is in the form of a honeycomb monolith. An α-alumina support comprising "an inner channel" includes a support comprising one inner channel as well as a support comprising a plurality of inner channels, such as a plurality of parallel inner channels extending through the support from the first end to the second end.

Total volume percent porosity (P) is the porosity in the α-alumina monolith support and can be measured by a mercury porosimetry method, which is well known in the art. The α-alumina monolith supports of the invention may be characterized by P≧35%, for example, 35%≦P≦65%; or 40%≦P≦65%, for example, 40%≦P≦55%.

As illustrated in FIG. 1, in order to gain increased permeability, the high purity α-alumina monolith supports should have a larger mean pore size and a narrower pore distribution with respect to their final target microstructures 10, for example, desired pore size distribution for increased permeability for fluid transport within a porous medium. The target microstructures 10 are achieved through reducing the bimodal distribution typically found in experimental batch compositions, for example, as shown in FIG. 1, batch composition 12, which has a composition comprising 15 weight % Canna starch and alpha-alumina comprising a mean particle size of 5.8 µm (processed at a sintering temperature of 1600° C.) and also by increasing the mean pore size. The resulting α-alumina monolith support made from the batch composition 12 is characterized as follows: P=45.28%, $dp_{50}$=3.39 μm, $dp_{10}$=0.95 μm, $dp_{90}$=5.45 μm and $d_f$=0.72.

The reduction or elimination of the bi-modal distribution and the increase in the mean pore size of the resulting α-alumina monolith support can be realized through controlling the batch composition properties, for example, the size and shape of the alumina, the size and volume of the pore former, additional batch components (i.e. crosslinkers) and the temperature and time of the sintering process.

The compositions and the methods of processing the compositions in order to form high purity α-alumina monolith supports, according to the invention, are demonstrated by the following examples.

Exemplary Compositions

The composition, according to some embodiments, comprises the following components:
1) 50 weight % to 90 weight % of α-alumina particles;
2) from 10 weight % to 30 weight % of organic pore former particles; and
3) from 1 weight % to 15 weight % of a sintering aid is described.

Figure 2:
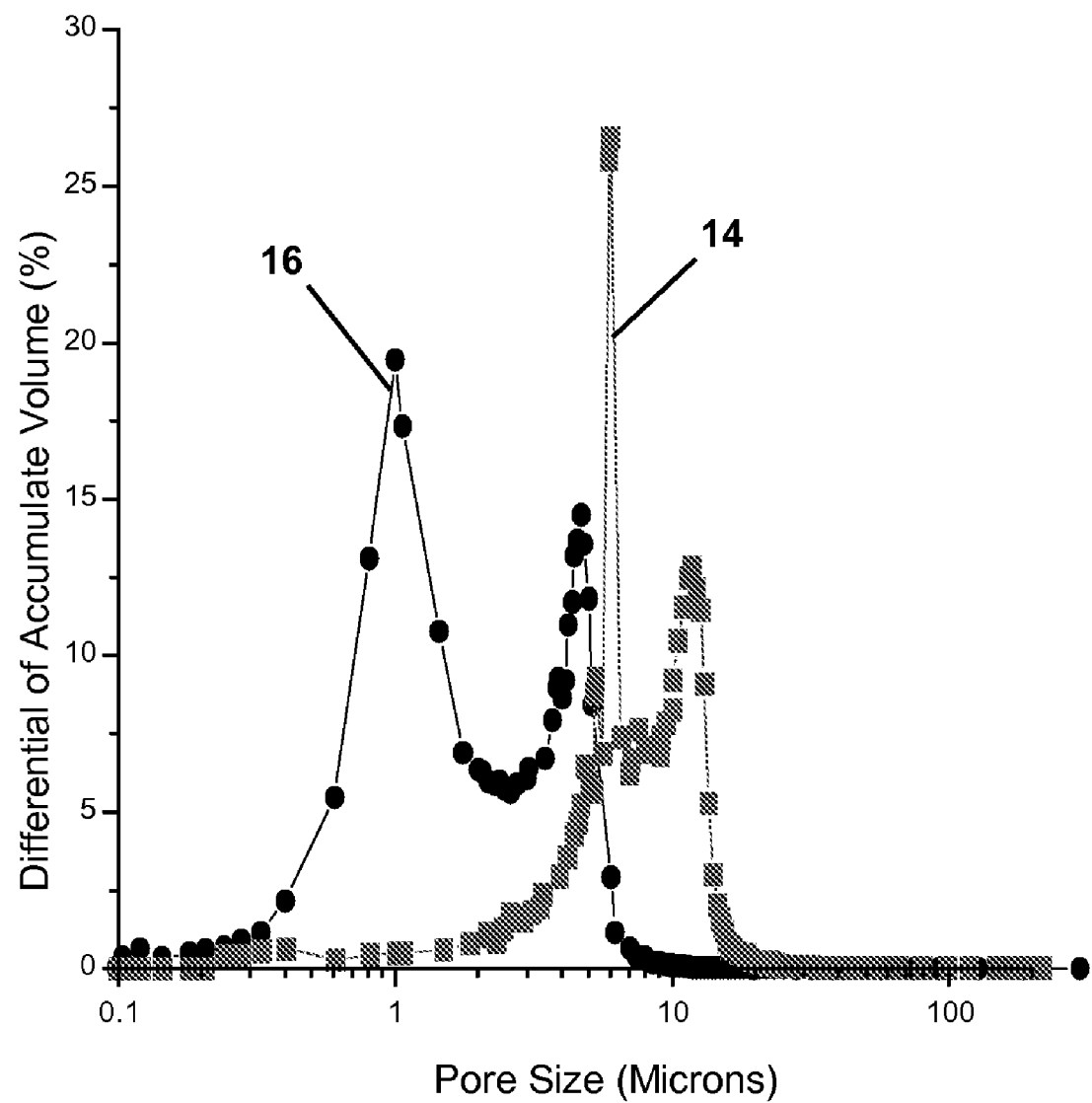
FIG. 2 is a graph showing the impact of alumina particle size on final pore size and pore size distribution in the resulting α-alumina support, according to some embodiments.

Regarding component 1), according to one embodiment, the α-alumina comprises from 50 weight % to 90 weight %, for example from 60 weight % to 70 weight % of the total composition. The impact of alumina particle size on final pore size and pore size distribution in the resulting α-alumina support is shown by the graph in FIG. 2. In this example, 15 weight % Canna starch pore former was used in two batch compositions. In the first composition 16, the mean alumina particle size was 5.8 μm, while in the second composition 14, the mean alumina particle size was 20 μm. When the starch and other variables are held constant, an increase in mean alumina particle size causes an increase in mean pore size. As evident in the graph shown in FIG. 2, an alumina precursor material having a larger mean particle size is advantageous for producing a larger mean pore size (7 μm to 10 μm) alumina in the resulting α-alumina support.

According to one embodiment, the α-alumina has a mean particle size of 15 microns or more. According to another embodiment, the α-alumina has a mean particle size of from 15 microns to 50 microns.

Regarding component 2), according to one embodiment, the organic pore former comprises 10 weight % to 30 weight %, for example, 20 weight % to 30 weight % of the total composition. According to one embodiment, the organic pore former is a starch. In another embodiment, the starch is selected from the group consisting of Canna starch, potato starch, green bean starch, corn starch, rice starch, and Sago starch. In one embodiment, the organic pore former has a mean particle size of from 7 μm to 45 μm, for example, from 10 μm to 25 μm.

Figure 3:
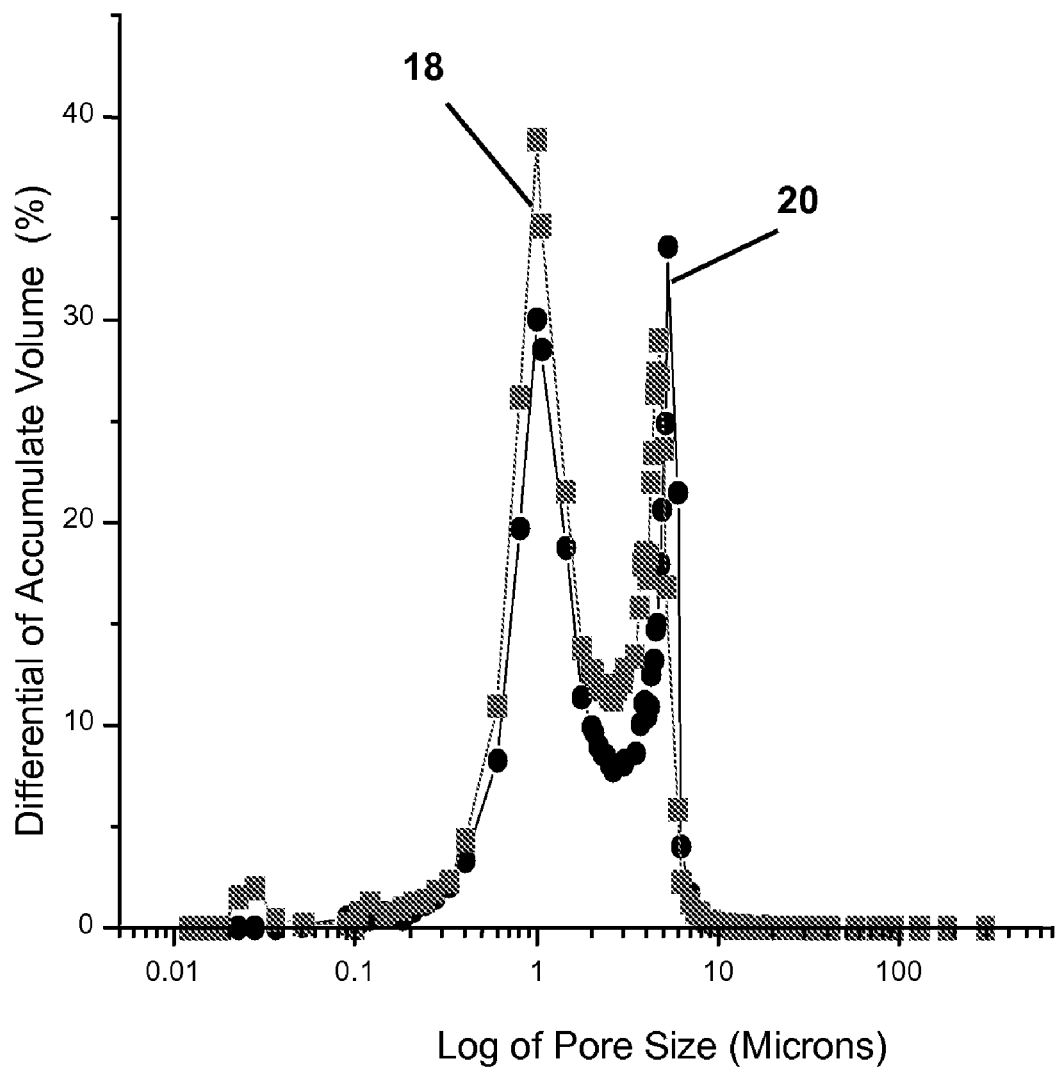
FIG. 3 is a graph showing the impact of the organic pore former particle size on final pore size and pore size distribution in the resulting α-alumina support, according to some embodiments.

The impact of the organic pore former mean particle size on final pore size and pore size distribution in batch compositions 18, 20 which have organic pore former particle sizes larger than their alumina particle sizes is shown by the graph in FIG. 3. Batch composition 18 comprises alumina having particles 6.8 μm in size and Canna starch having particles 47 μm in size. Batch composition 20 comprises alumina having particles 6.8 μm in size and sago starch having particles 32 μm in size. The resulting α-alumina monolith support made from the batch composition 18 is characterized as follows: Porosity=45.28%, $dp_{50}$=3.39 μm, $dp_{10}$=0.95 μm, $dp_{90}$=5.45 μm and $d_f$=0.72. The resulting α-alumina monolith support made from the batch composition 20 is characterized as follows: Porosity=45.95%, $dp_{50}$=4.47 μm, $dp_{10}$=1.03 μm, $dp_{90}$=5.92 μm and $d_f$=0.77.

When the organic pore former particle size (PS) is larger than the alumina particle size (PS), a bimodal pore size distribution is observed in the α-alumina support. The total mean pore size is not determined by the organic pore former size, but rather by the alumina/organic pore former particle packing characteristics. To minimize an undesirable bimodal pore size distribution ($d_{ps}$) it is best to select $PS_{alumina}$ > $PS_{pore\ former}$. Due to improved particle packing, both the total porosity and pore size increase as the volume of the pore former is increased, while the pore size distribution becomes narrower.

Plate-like alumina particles tend to aggregate together during the extrusion process causing a bimodal pore size distribution when mixed with the organic pore former. This can be minimized by mixing plate alumina with spheroidal organic pore former. Alumina and organic pore former particle shape similarity contribute to a narrower pore size distribution.

Regarding component 3), according to one embodiment, the sintering aid comprises from 1 weight % to 15 weight %, for example 5 weight % to 10 weight % of the total composition. According to one embodiment, the sintering aid is selected from the group consisting of boehmite sol, alumina organic compounds, $TiO_2$, CuO, $MnO_2$, MgO, $ZrO_2$, $Y_2O_3$, colloidal alumina, $SiO_2$, AlO(OH) slurry and sodium alumina ($Al_2O_3 \cdot Na_2O$). Examples of sources of exemplary sintering aids are as follows: colloidal alumina from AL20, $TiO_2$ from tetra-isopropyl titanate (TPT), CuO from copper acetate or copper nitrate, $MnO_2$ from manganese acetate, manganese nitrate or manganese oxalate, MgO from magnesium acetate or magnesium nitrate, $ZrO_2$ from colloidal zirconia, $Y_2O_3$ from yttrium salts, and colloidal alumina from AL20. The sintering aid can function to reduce the melting point of the α-alumina.

The use of a sintering aid can narrow the pore size distribution and increase the resulting α-alumina support strength. However, introduction of non-Al additives into the extrusion batch lowers purity of the resulted honeycomb monolith and may decrease chemical stability. Thus, a sintering aid containing an Al metal element is advantageous, in part, because the Al in such additives is converted into alpha-alumina crystal phase after the sintering the shaped green body, which does not affect the chemical purity of the final α-alumina support.

According to one embodiment, the composition further comprises an organic crosslinker. According to one embodiment, the organic crosslinker is selected from the group consisting of an organic agent, epichlorohydrin, cyclopolyamine oligomer and ionene. The organic crosslinker, for example, epichlorohydrin, cyclopolyamine oligomer, ionene, BERSET® 2700 manufactured by Bercen, Inc. or the like can function to crosslink the organic pore former.

According to another embodiment, the composition comprises forming aids that may include a lubricant, a binder, and/or a solvent vehicle. Methocel is an exemplary binder. Water is an exemplary solvent vehicle.

Exemplary compositions useful for, for example, batch compositions for the α-alumina supports of the invention are shown in Table 1.

TABLE 1

Exemplary Alumina Membrane Support Compositions

| | Example No. | | | | | | |
|---|---|---|---|---|---|---|---|
| | 1 | 2 | 3 | 4 | 5 | 6 | 7 |
| | | | | Composition Code | | | |
| | XFN167 | WIJ167 | JCK166 | WIS167 | WII167 | WJE167 | WKS167 |
| Pore Former | | | | | | | |
| Starch Type | Corn | Green Bean | Canna | Canna | Rice | Green Bean | Rice |
| Wt % Starch | 18.2 | 25 | 15 | 15 | 15 | 25 | 5 |
| Starch Mean Particle size (μ) | 15 | 23 | 48 | 48 | 7 | 23 | 7 |
| Inorganic Raw Materials | | | | | | | |
| Alumina type | Alcan C701 | Sumicorundum AA18 | Norton 7921 | Norton 7921 | Sumicorundum AA18 | Sumicorundum AA18 + 625mesh | Sumicorundum AA18 |
| Alumina (Wt %) | 91.06 | 100 | 100 | 100 | 100 | 100 | 100 |
| Alumina Mean Particle Size (μ) | 5.8 | 20 | 18 | 18 | 20 | 23 | 20 |
| Boehmite gamma alumina (Wt %) | 9.1 | — | — | — | — | — | — |
| Colloidal Gamma Alumina Solution (AL20) Wt % | 25 | 31 | 0 | 33 | 0 | 25 | 0 |
| Organic Materials | | | | | | | |
| Methyl Cellulose | 5 | 4.5 | 4 | 4 | 4 | 4.5 | 4 |
| Liga | 0.8 | 1 | 0.5 | 0.5 | 0 | 1 | 0 |
| Emulsia T (Tall oil, TEA, Water) | 0 | 0 | 0 | 0 | 10 | 0 | 10 |
| Bereset 2700 | 0 | 0 | 0 | 0 | 12 | 0 | 12 |

Exemplary Methods of Making α-Alumina Supports

A method of synthesizing an α-alumina support, according to some embodiments, comprises the following steps:
1) providing a batch composition comprising 50 weight % to 90 weight % α-alumina particles, 10 weight % to 30 weight % of an organic pore former particles and 1 weight % to 15 weight % of a sintering aid;
2) shaping the batch to form a green body; and
3) sintering the green body to form the α-alumina support.

Regarding step 1), according to one embodiment, the method further comprises providing the batch composition by combining the 50 weight % to 90 weight % α-alumina particles, 10 weight % to 30 weight % of the organic pore former particles and 1 weight % to 15 weight % of the sintering aid and mixing the α-alumina particles, the organic pore former particles and the sintering aid to provide a homogeneous mixture.

Regarding step 2), according to one embodiment, the method comprises extruding the batch through an extrusion die. The shaping can be accomplished by an extrusion process by several methods commonly know in the art, for example, by extruding the mixture from a twin screw or ram extruder through an extrusion die, as described in U.S. Pat. No. 6,080,348.

Batch compositions of the invention can be extruded in several geometries producing useful alpha-alumina supports for several applications (water filtration, air filtration, liquid separation, etc). Useful geometries, for example, include honeycomb monolith structures comprising 1 mm rounded channels or cells, a cell density of 100 cells per square inch (cpsi) to 600 cpsi, where the channels are substantially parallel with respect to each other and may be produced within a wide range of thicknesses.

Regarding step 3), according to one embodiment, the method comprises sintering the green body, wherein the sintering comprises heating or soaking the green body at a temperature of from 1500 degrees Celcius to 2000 degrees Celcius for from 1 hour to 16 hours, for example from 8 hours to 16 hours. Although the sintering temperature, in this example, is 1600° C., sintering temperature can be in the range of from 1500° C. to 2000° C., for example, from 1550° C. to 1780° C. depending on the application. Typically, higher sintering temperatures result in higher strength, lower porosity and more uniform pore distribution.

According to another embodiment, sintering the green body comprises heating the green body at a temperature of from 1600 degrees Celcius to 1775 degrees Celcius for from 8 hours to 16 hours.

Figure 4:
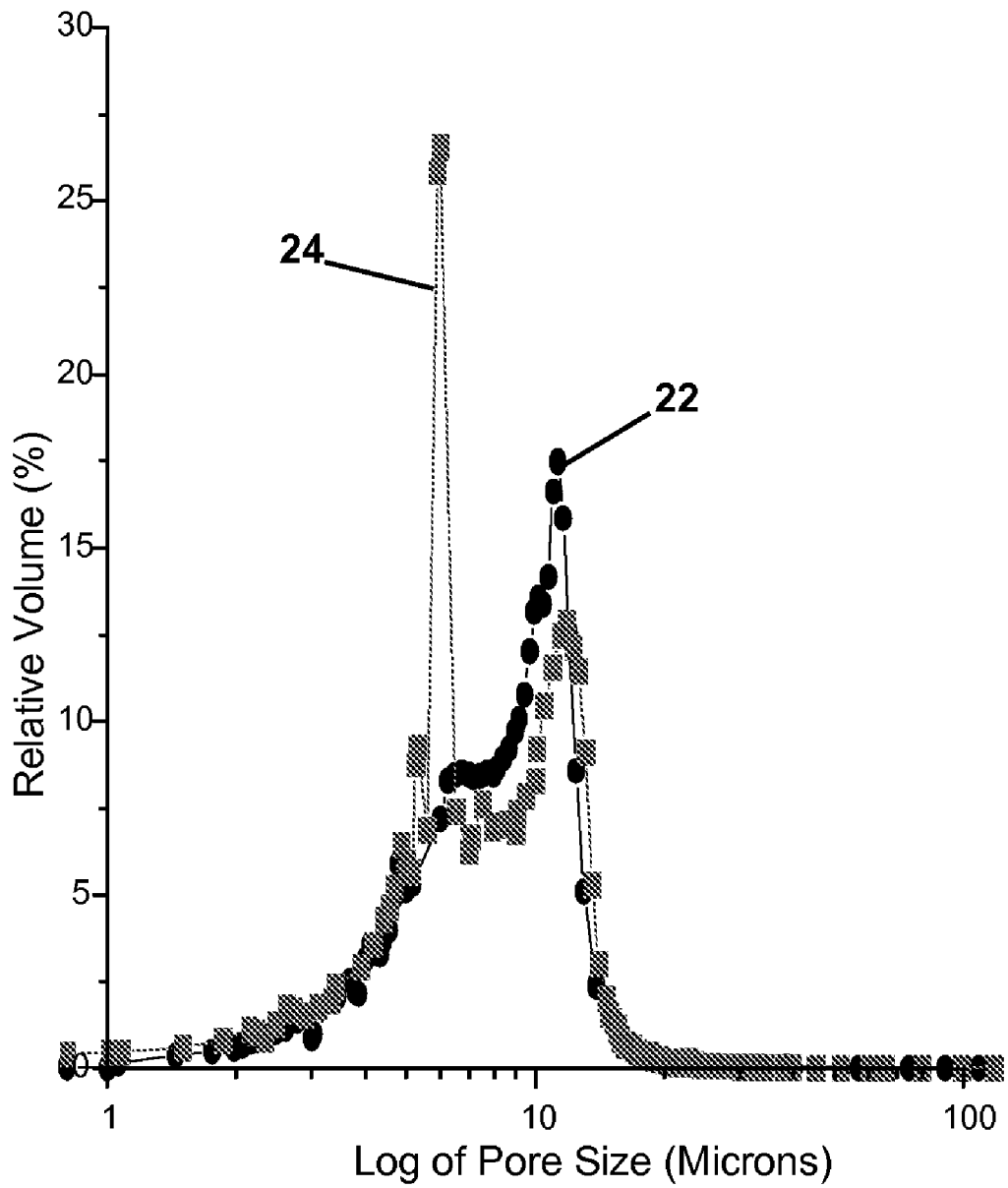
FIG. 4 is a graph showing the impact of sintering temperature on pore size and pore size distribution in the resulting α-alumina support, according to some embodiments.

The impact of sintering temperature on pore size and pore size distribution is shown in FIG. 4. An increase in the sintering temperature will reduce the porosity and mean pore size, but will also significantly increase strength. A long hold time at the soaking temperature will reduce the porosity and mean pore size while increasing the pore size distribution. Therefore, a shorter hold time at the soaking temperature is preferred. Batch composition 24 comprises alumina having particles 20 μm in size and 15 weight percent Canna starch. The extruded alpha-alumina support was dried and then fired at 1600° C. Batch composition 22 comprises alumina having particles 20 μm in size and 15 weight percent Canna starch. The extruded alpha-alumina support was dried and then fired at 1750° C. The resulting α-alumina monolith support made from the batch composition 24 is characterized as follows: P=64.6%, $dp_{50}$=10.07 μm, $dp_{10}$=5.13 μm, $dp_{90}$=14.02 μm and $d_f$=0.49. The resulting α-alumina monolith support made from the batch composition 22 is characterized as follows: P=55.2%, $dp_{50}$=9.94 μm, $dp_{10}$=5.40 μm, $dp_{90}$=13.10 μm and $d_f$=0.46.

Figure 5:
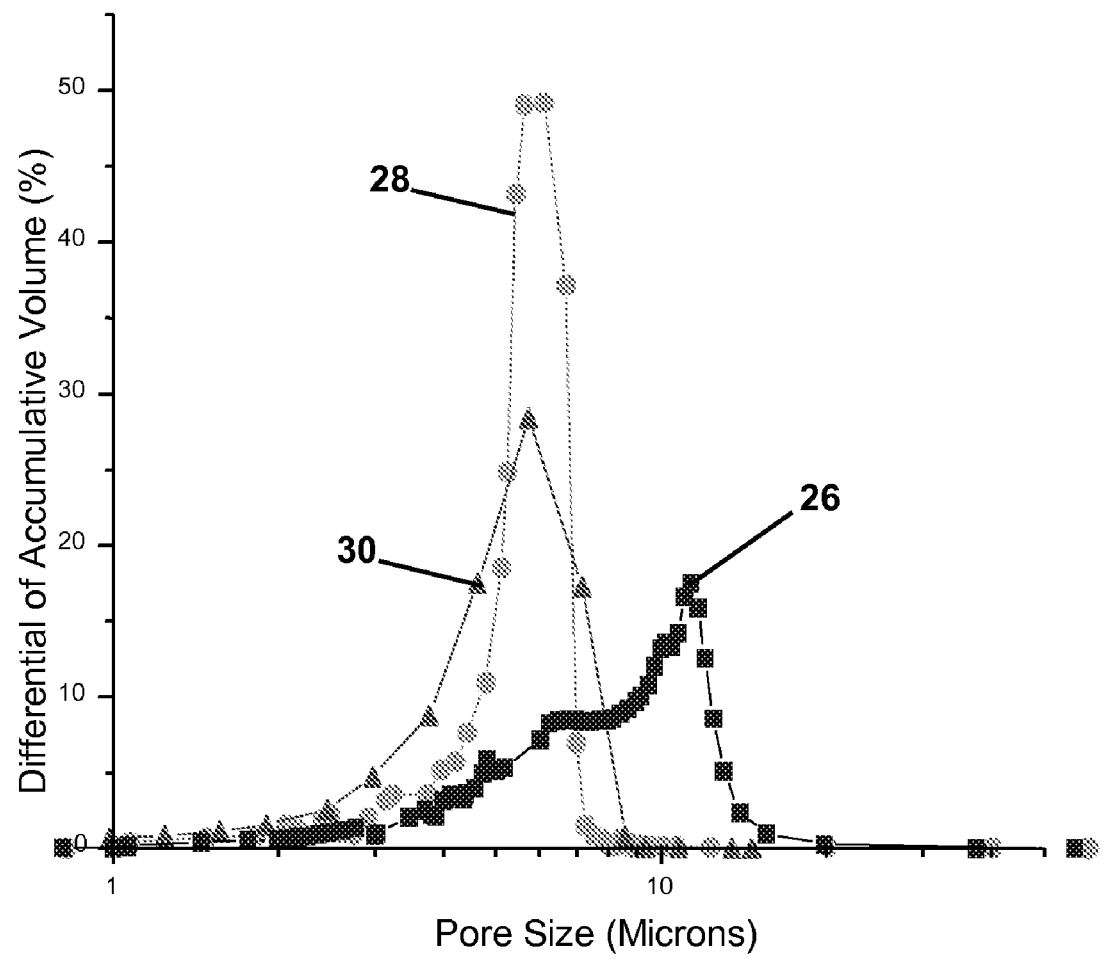
FIG. 5 is a graph showing the porosity results for two compositions, according to the invention, as compared to the porosity results for various conventional control materials.

The data in FIG. 5 shows the porosity results for two compositions (composition 3 26 and composition 7 28 shown in Table 1) prepared using a method described by the invention as compared to the porosity results for the control 30, Corning Mullite.

The ideal pore structure ($dp_{50}$=7 μm-15 μm, porosity=43%-50%, $(dp_{50}-dp_{10})/dp_{50}$<0.25) for the α-alumina supports was achieved using larger alumina particles (>20 μm), a smaller particle size starch pore former (<10 μm), similar alumina and starch particle shapes, a maximal volume of starch (5-15 wt. %), and sintering at higher temperature (1775° C.) for 8-16 h in the presence of a crosslinker such as ionene or a sintering aid as described above.

Table 2 shows water and $N_2$ permeability data for α-alumina supports prepared using the methods described by the invention as compared to control materials.

TABLE 2

| Batch Composition | 3 | 3 | Control | Control |
|---|---|---|---|---|
| Extrusion batch | Canna Starch 18 μm alumina | Canna Starch 18 μm alumina | Canna starch Al15 alumina | Sago starch Al15 alumina |
| Firing temperature | 1600° C. | 1750° C. | 1600° C. | 1600° C. |
| Porosity % | 64.6 | 55.2 | 50.3 | 46.0 |
| Intrusion pore volume, cc/g | 0.41 | 0.32 | 0.22 | 0.22 |
| Median Diameter (dp50), μm | 10.1 | 9.9 | 3.7 | 4.5 |
| dp10 μm | 5.1 | 5.4 | 1.0 | 1.0 |
| dp90 μm | 14.0 | 13.1 | 6.2 | 5.9 |
| (dp50 − dp10)/dp50 | 0.5 | 0.5 | 0.7 | 0.8 |
| Pure water permeability at 22° C. | | | | |
| Permeance, L/h/m2/bar | 122,137 | 128,200 | 11,545 | 16,181 |
| Pure N$_2$ gas permeability at 22° C. | | | | |
| Permeance, sccm/cm2/bar | 12,934 | 13,130 | 2,556 | 2,792 |

The batch compositions described in Table 2 were extruded into single-channel form to measure intrinsic permeability. Table 2 also shows that α-alumina supports having the desirable properties (i.e. high porosity, large mean pore size, lower pore size distribution) resulting from their preparation according to the methods of the invention are found to have substantially increased water and nitrogen gas permeability—by nearly one order of magnitude over the control materials having less desirable properties.

The characteristic properties of the α-alumina and the pore former in the batch composition, particularly particle size and shape, together with the sintering process parameters, contribute to the overall pore distribution of the α-alumina inorganic membrane support. Examples are shown in Table 3.

bution is favored and influenced by the starch pore former particle size and distribution. An alumina support with narrow pore distribution and larger mean pore size can be prepared by both careful material selection (alumina and starch particle size, size distribution, shape, and volume, as well as selection of sintering agents) and process optimization (soaking time and sintering temperature) which can control particle packing by influencing boundary diffusion.

Making use of this understanding of the factors influencing microstructure optimization in a single inorganic component (alumina) system, the α-alumina supports of the invention exhibit a very narrow pore distribution ($(dp_{50}-dp_{10}/dp_{50}=0.21)$, which is much less than the control material)

TABLE 3

Exemplary Membrane Support

| | Example No. | | | | | | |
|---|---|---|---|---|---|---|---|
| | 1 | 2 | 3 | 4 | 5 | 6 | 7 |
| | | | | Composition Code | | | |
| | XFN167 | WIJ167 | JCK166 | WIS167 | WII167 | WJE167 | WKS167 |
| | | | | Properties | | | |
| Soak Temperature (° C.) | 1600 | 1775 | 1750 | 1750 | 1750 | 1750 | 1775 |
| Soak Time (hours) | 8 | 8 | 16 | 16 | 8 | 8 | 8 |
| | | | | Fired Properties | | | |
| MOR rod (psi) | 7930.5 | 2724.5 | 2174 | 6636 | 1945.7 | 2441.2 | 2443.2 |
| Predominant Phase | Corundum | Corundum | Corundum | Corundum | Corundum | Corundum | Corundum |
| Porosity (%) | 47.16 | 50.49 | 55.12 | 48.5 | 48.3 | 50.6 | 43.98 |
| d1 (μ) | 0.4 | 2.54 | | 1.56 | 2.78 | 2.61 | |
| dp10 (m) | 1.06 | 5.78 | 5.31 | 3.21 | 5.43 | 5.9 | 4.69 |
| dp50 (m) | 2.31 | 9.5 | 10.52 | 6.43 | 6.91 | 9.66 | 6.07 |
| dp90 (m) | 2.78 | 11.1 | 13.46 | 8.62 | 16.39 | 11.55 | 6.71 |
| df = (dp50 − dp10)/dp50 | 0.54 | 0.39 | 0.50 | 0.50 | 0.21 | 0.39 | 0.23 |
| db = (dp90 − dp10)/dp50 | 0.74 | 0.56 | 0.77 | 0.84 | 1.59 | 0.58 | 0.33 |

The extrusion batch composition is designed to optimize pore size distribution using a rationale based on an understanding of the role that particle packing plays in pore formation. Two Gaussian functions can be used to describe the final pore distribution. A broad Gaussian distribution with a fine mean pore size is a result of, and is mainly influenced by, α-alumina particle packing, while a narrow Gaussian distriefficiently filling alumina particle packing gaps with starch pore former and firing at a temperature close to the melting temperature of the alumina in the presence of an included sintering aid such as AL20, a 50 nanometer alumina. This high permeability α-alumina support has a mean pore size greater than 6 μm, a porosity of greater than 43%, and high strength (MOR or modulus of rupture greater than 5000 psi).

The invention provides suitable membrane supports to facilitate the product concept described in US Patent Application Publication 2006/0090649 (referenced above) and also is suitable for supporting the nano-sized needle crystal mullite films to form an inorganic membrane as described in commonly owned U.S. patent application Ser. No. 11/585,477. As compared to mullite based inorganic membrane support materials the α-alumina supports of the invention possess higher porosity, larger mean pore size, a more narrow pore size distribution, higher mechanical strength, and higher chemical resistance. The structural uniformity (in terms of narrow pore size distribution) of the α-alumina of this invention is better than that of the control materials.

It will be apparent to those skilled in the art that various modifications and variations can be made to the invention without departing from the spirit or scope of the invention. Thus, it is intended that the invention cover the modifications and variations of this invention provided they come within the scope of the appended claims and their equivalents.

What is claimed is:

1. A method of forming an α-alumina support, the method comprising;
    providing a batch composition comprising 50 weight % to 90 weight % α-alumina particles, 10 weight % to 30 weight % of organic pore former particles and 1 weight % to 15 weight % of a sintering aid;
    shaping the batch to form a green body; and
    sintering the green body to form the α-alumina support, wherein the α-alumina support comprises a mean pore size of from 6 microns to 15 microns and having a pore size distribution ($d_{ps}$) of from 0.50 to 1.70 as described by the formula:

$$d_{ps}=(dp_{90}-dp_{10})/dp_{50};$$

wherein $dp_{10}$ is a pore size wherein 10% of the pore volume has a smaller pore size;
    $dp_{50}$ is a median pore size wherein 50% of the pore volume has a smaller pore size; and
    $dp_{90}$ is a pore size wherein 90% of the pore volume has a smaller pore size.

2. The method according to claim 1, comprising providing the batch composition by combining the 50 weight % to 90 weight % α-alumina particles, 10 weight % to 30 weight % of the organic pore former particles and 1 weight % to 15 weight % of the sintering aid and mixing the α-alumina particles, the organic pore former particles and the sintering aid to provide a homogeneous mixture.

3. The method according to claim 1, wherein the sintering the green body comprises heating the green body at a temperature of from 1500 degrees Celcius to 2000 degrees Celcius for from 1 hour to 16 hours.

4. The method according to claim 1, wherein the sintering the green body comprises heating the green body at a temperature of from 1600 degrees Celcius to 1775 degrees Celcius for from 8 hours to 16 hours.

5. The method according to claim 1, wherein the organic pore former is a starch.

6. The method according to claim 5, wherein the starch is selected from the group consisting of Canna starch, potato starch, green bean starch, corn starch, rice starch, and Sago starch.

7. The method according to claim 1, wherein the shaping the batch comprises extruding the batch through an extrusion die.

8. An α-alumina support comprising a mean pore size of from 6 microns to 15 microns and having a pore size distribution ($d_{ps}$) of from 0.50 to 1.70 as described by the formula:

$$d_{ps}=(dp_{90}-dp_{10})/dp_{50};$$

wherein $dp_{10}$ is a pore size wherein 10% of the pore volume has a smaller pore size;
    $dp_{50}$ is a median pore size wherein 50% of the pore volume has a smaller pore size; and
    $dp_{90}$ is a pore size wherein 90% of the pore volume has a smaller pore size.

9. The α-alumina support according to claim 8, having a $d_f$ of from 0.20 to 0.60 as described by the formula:

$$d_f=(dp_{50}-dp_{10})/dp_{50}.$$

10. The α-alumina support according to claim 8, comprising a first end, a second end, and an inner channel having surfaces defined by porous walls and extending through the support from the first end to the second end.

11. The α-alumina support according to claim 10, wherein the α-alumina support is in the form of a honeycomb monolith.

* * * * *